United States Patent
Corcoran et al.

(10) Patent No.: US 8,169,486 B2
(45) Date of Patent: May 1, 2012

(54) IMAGE ACQUISITION METHOD AND APPARATUS

(75) Inventors: Peter Corcoran, Claregalway (IE); Eran Steinberg, San Francisco, CA (US); Petronel Bigioi, Galway (IE); Alexandru Drimbarean, Galway (IE); Adrian Zamfir, Bucharest (RO); Corneliu Florea, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 804 days.

(21) Appl. No.: 11/753,098

(22) Filed: May 24, 2007

(65) Prior Publication Data
US 2007/0296833 A1 Dec. 27, 2007

Related U.S. Application Data

(60) Provisional application No. 60/803,980, filed on Jun. 5, 2006, provisional application No. 60/892,880, filed on Mar. 5, 2007.

(51) Int. Cl.
*H04N 5/228* (2006.01)
(52) U.S. Cl. ................................. 348/208.13
(58) Field of Classification Search ............... 348/208.2, 348/208.4, 208.5, 208.13, 208.16, 362, 364, 348/367
See application file for complete search history.

(56) References Cited

U.S. PATENT DOCUMENTS

| | | | |
|---|---|---|---|
| 5,251,019 A | 10/1993 | Moorman et al. | |
| 5,374,956 A | 12/1994 | D'Luna | |
| 5,392,088 A | 2/1995 | Abe et al. | |
| 5,428,723 A | 6/1995 | Ainscow et al. | |
| 5,510,215 A | 4/1996 | Prince et al. | |
| 5,599,766 A | 2/1997 | Boroson et al. | |
| 5,686,383 A | 11/1997 | Long et al. | |
| 5,747,199 A | 5/1998 | Roberts et al. | |
| 5,751,836 A | 5/1998 | Wildes et al. | |
| 5,756,239 A | 5/1998 | Wake | |
| 5,756,240 A | 5/1998 | Roberts et al. | |
| 5,802,220 A | 9/1998 | Black et al. | |
| 5,889,277 A | 3/1999 | Hawkins et al. | |

(Continued)

FOREIGN PATENT DOCUMENTS
DE 3729324 A1 3/1989
(Continued)

OTHER PUBLICATIONS
Crowley, James L. and Francois Berard, "Multi-Modal Tracking of Faces for Video Communications (1997)," In Computer Vision and Pattern Recognition, 1997. http://citeseer.ist.psu.edu/crowley97multimodal.html.

(Continued)

*Primary Examiner* — Albert Cutler
(74) *Attorney, Agent, or Firm* — Andrew V. Smith

(57) ABSTRACT

An image acquisition sensor of a digital image acquisition apparatus is coupled to imaging optics for acquiring a sequence of images. Images acquired by the sensor are stored. A motion detector causes the sensor to cease capture of an image when the degree of movement in acquiring the image exceeds a threshold. A controller selectively transfers acquired images for storage. A motion extractor determines motion parameters of a selected, stored image. An image re-constructor corrects the selected image with associated motion parameters. A selected plurality of images nominally of the same scene are merged and corrected by the image re-constructor to produce a high quality image of the scene.

24 Claims, 5 Drawing Sheets

U.S. PATENT DOCUMENTS

| | | |
|---|---|---|
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |
| 6,041,078 A | 3/2000 | Rao |
| 6,061,462 A | 5/2000 | Tostevin et al. |
| 6,081,606 A | 6/2000 | Hansen et al. |
| 6,114,075 A | 9/2000 | Long et al. |
| 6,122,017 A | 9/2000 | Taubman |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,360,003 B1 | 3/2002 | Doi et al. |
| 6,365,304 B2 | 4/2002 | Simons |
| 6,381,279 B1 | 4/2002 | Taubman |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,741,960 B2 * | 5/2004 | Kim et al. ............. 704/219 |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,177,538 B2 | 2/2007 | Sato et al. |
| 7,180,238 B2 | 2/2007 | Winters |
| 7,195,848 B2 | 3/2007 | Roberts |
| 7,269,292 B2 | 9/2007 | Steinberg |
| 7,292,270 B2 | 11/2007 | Higurashi et al. |
| 7,315,324 B2 * | 1/2008 | Cleveland et al. ......... 348/208.4 |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,493 B2 | 11/2008 | Pilu |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,489,341 B2 | 2/2009 | Yang et al. |
| 7,548,256 B2 | 6/2009 | Pilu |
| 7,551,755 B1 | 6/2009 | Steinberg et al. |
| 7,565,030 B2 | 7/2009 | Steinberg et al. |
| 7,593,144 B2 * | 9/2009 | Dymetman ................ 358/474 |
| 7,623,153 B2 | 11/2009 | Hatanaka |
| 7,639,888 B2 | 12/2009 | Steinberg et al. |
| 7,680,342 B2 | 3/2010 | Steinberg et al. |
| 7,916,971 B2 | 3/2011 | Bigioi et al. |
| 7,970,182 B2 | 6/2011 | Prilutsky et al. |
| 2001/0036307 A1 | 11/2001 | Hanna et al. |
| 2002/0006163 A1 | 1/2002 | Hibi et al. |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0066981 A1 * | 4/2004 | Li et al. ................ 382/286 |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0130628 A1 * | 7/2004 | Stavely .................. 348/208.4 |
| 2004/0145659 A1 | 7/2004 | Someya et al. |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2004/0247179 A1 | 12/2004 | Miwa et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068452 A1 | 3/2005 | Steinberg et al. |
| 2005/0140801 A1 | 6/2005 | Prilutsky et al. |
| 2005/0140829 A1 | 6/2005 | Uchida et al. |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0248660 A1 * | 11/2005 | Stavely et al. ........... 348/208.16 |
| 2005/0259864 A1 | 11/2005 | Dickinson et al. |
| 2005/0270381 A1 | 12/2005 | Owens et al. |
| 2005/0281477 A1 | 12/2005 | Shiraki et al. |
| 2006/0006309 A1 | 1/2006 | Dimsdale et al. |
| 2006/0017837 A1 | 1/2006 | Sorek et al. |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0133688 A1 | 6/2006 | Kang et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0083114 A1 * | 4/2007 | Yang et al. ............... 600/437 |
| 2007/0086675 A1 | 4/2007 | Chinen et al. |
| 2007/0097221 A1 * | 5/2007 | Stavely et al. ........... 348/208.11 |
| 2007/0110305 A1 | 5/2007 | Corcoran et al. |
| 2007/0147820 A1 | 6/2007 | Steinberg et al. |
| 2007/0201724 A1 | 8/2007 | Steinberg et al. |
| 2007/0234779 A1 | 10/2007 | Hsu et al. |
| 2007/0269108 A1 | 11/2007 | Steinberg et al. |
| 2008/0012969 A1 | 1/2008 | Kasai et al. |
| 2008/0037827 A1 | 2/2008 | Corcoran et al. |
| 2008/0037839 A1 | 2/2008 | Corcoran et al. |
| 2008/0043121 A1 | 2/2008 | Prilutsky et al. |
| 2008/0175481 A1 | 7/2008 | Petrescu et al. |
| 2008/0211943 A1 | 9/2008 | Egawa et al. |
| 2008/0218611 A1 | 9/2008 | Parulski et al. |
| 2008/0219581 A1 | 9/2008 | Albu et al. |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2009/0003652 A1 | 1/2009 | Steinberg et al. |
| 2009/0009612 A1 * | 1/2009 | Tico et al. ............... 348/208.1 |
| 2009/0080713 A1 | 3/2009 | Bigioi et al. |
| 2009/0080796 A1 | 3/2009 | Capata et al. |

| | | | |
|---|---|---|---|
| 2009/0080797 | A1 | 3/2009 | Nanu et al. |
| 2009/0179999 | A1 | 7/2009 | Albu et al. |
| 2009/0185041 | A1 | 7/2009 | Kang et al. |

FOREIGN PATENT DOCUMENTS

| | | | |
|---|---|---|---|
| DE | 10154203 A1 | 6/2002 | |
| DE | 10107004 A1 | 9/2002 | |
| EP | 0944251 A1 | 9/1999 | |
| EP | 944251 B1 | 4/2003 | |
| EP | 1583033 A2 | 10/2005 | |
| EP | 1779322 B1 | 1/2008 | |
| EP | 1429290 B1 | 7/2008 | |
| JP | 10285542 A | 10/1998 | |
| JP | 11327024 A2 | 11/1999 | |
| JP | 2008520117 T | 6/2008 | |
| WO | WO-9843436 A1 | 10/1998 | |
| WO | WO 01/13171 A1 | 2/2001 | |
| WO | WO-0245003 A1 | 6/2002 | |
| WO | WO-03071484 A1 | 8/2003 | |
| WO | WO-04001667 A2 | 12/2003 | |
| WO | WO 2004/036378 A2 | 4/2004 | |
| WO | WO-2006050782 A1 | 5/2006 | |
| WO | WO-2007093199 A2 | 8/2007 | |
| WO | WO-2007093199 A3 | 8/2007 | |
| WO | WO 2007/143415 | 12/2007 | |
| WO | WO-2007142621 A1 | 12/2007 | |
| WO | WO-2008017343 A1 | 2/2008 | |
| WO | WO 2007/143415 A3 | 5/2008 | |
| WO | WO-2008131438 A2 | 10/2008 | |
| WO | WO-2009036793 A1 | 3/2009 | |

OTHER PUBLICATIONS

Jiang Wei; Lu Jian, "Dense Panoramic Imaging and 3D Reconstruction by Sensors Fusion," Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, vol. 2006 , p. 2P1-C15. http://rlinks2.dialog.com/NASApp/ChannelWEB/DialogProServlet?ChName=engineering.
Junping Zhang; Xiaofei Wang; Tao Chen; Ye Zhang, "Change detection for the urban area based on multiple sensor information fusion," IEEE International Geoscience and Remote Sensing Symposium, p. 4 pp. Publisher: IEEE, Piscataway, NJ, USA, 2005. Conference: IGARSS 2005. IEEE International Geoscience and Remote Sensing Symposium, Jul. 25-29, 2005, Seoul, South Korea. http://rlinks2.dialog.com/NASApp/ChannelWEB/DialogProServlet?ChName=engineering.
Lhuillier, M.; Quan, L., "A quasi-dense approach to surface reconstruction from uncalibrated images," IEEE Transactions on Pattern Analysis and Machine Intelligence, vol. 27, No. 3, p. 418-33. Publisher: IEEE Comput. Soc, Mar. 2005. http://rlinks2.dialog.com/NASApp/ChannelWEB/DialogProServlet?ChName=engineering.
Patti A. and M. Sezan and M. Tekalp, "Super-Resolution video reconstruction with arbitrary sampling lattices and non-zero aperture time", In IEEE Transactions on Image Processing (Aug. 1997), pp. 1064-1078. http://citeseer.ist.psu.edu/patti97super.html.
Pulli, Kari and Tom Duchamp, Hugues Hoppe, John McDonald, Linda Shapiro, Werner Stuetzle, "Robust Meshes from Multiple Range Maps (1997)," In Proc. IEEE International Conference on Recent Advances in 3-D Digital Imaging and Modeling (May 1997). http:// citeseer.ist.psu.edu/pulli97robust.html.
Schultz, Richard R. and Robert L. Stevenson, "Extraction of High-Resolution Frames from Video Sequences (1996)," IEEE transactions on image processing (1996), pp. 996-1011. http://citeseer.ist.psu.edu/schultz96extraction.html.
She, Peng and Okudaira Masashi, "Motion View Reconstruction Method with Real Object Image based on Virtual Object Movement," Eizo Joho Media Gakkai Gijutsu Hokoku, 2005, vol. 29, No. 17(ME2005 50-72) , p. 67-70. http://rlinks2.dialog.com/NASApp/ChannelWEB/DialogProServlet?ChName=engineering <http://rlinks2.dialog.com/NASApp/ChannelWEB/DialogProServlet?ChName=engineering>.
Siu, Angus; M.K. Lau, and W. H. Rynson, "Image registration for image-based rendering," IEEE Transactions on Image Processing v 14 n Feb. 2, 2005. p. 241-252, 2005. http://rlinks2.dialog.com/NASApp/ChannelWEB/DialogProServlet?ChName=engineering.
Sung Cheol Park; Min Kyu Park; Moon Gi Kang, "Super-resolution image reconstruction: a technical overview," in Signal Processing Magazine, IEEE Publication (May 2003), vol. 20, Issue 3, pp. 21 36. ISSN: 1053-5888. DOI: 10.1109/MSP.2003.1203207. Posted online: Jun. 11, 2003 15:49:40.0 http://ieeexplore.ieee.org/search/freesrchabstract.jsp?arnumber=1203207&isnumber=27099&punumber=79&k2dockey=1203207@ieeejrns&query=%28image+and+acquisition+and+sequence+and+reconstruction%29+%3Cin%3E+metadata&pos=3.
Andrews, H.C. et al., "Digital Image Restoration", Prentice Hall, 1977.
Zitova, Barabara et al., "Image registration methods: a survey," Image and Vision Computing, 2003, pp. 977-1000, vol. 21.
Bates et al., "Some Implications of Zero Sheets for Blind Deconvolution and Phase Retrieval", J. Optical Soc. Am. A, 1990, pp. 468-479, vol. 7.
Ben Ezra, Moshe et al., "Motion Deblurring Using Hybrid Imaging", Proceedings IEEE Computer Society Conference on Computer Vision and Pattern Recognition, 2003.
Ben-Ezra, M. el al., "Motion-Based Motion Deblurring", IEEE Transactions on Pattern Analysis and Machine Intelligence, 2004, pp. 689-698, vol. 26—Issue 6.
Bennett, Eric P. et al., "Video Enhancement Using Per-Pixel Virtual Exposures", International Conference on Computer Graphics and Interactive Techniques, ACM Siggraph, 2005, pp. 845-852.
Bhaskaran, V. et al., "Motion estimation using a computation-constrained criterion", Digital Signal Processing Proceedings , 1997, pp. 229-232, vol. 1.
Bones et al., "Deconvolution and Phase Retrieval With Use of Zero Sheets", J. Optical Soc. Am. A, 1995, pp. 1,842-1,857, vol. 12.
Cannon M., "Blind Deconvolution of Spatially Invariant Image Blurs with Phase," IEEE Transactions on Acoustics, Speech, and Signal Processing, 1976, vol. ASSP-24, No. 1.
Chen-Kuei Y. et al., "Color image sharpening by moment-preserving technique", Signal Processing, 1995, pp. 397-403, vol. 45—Issue 3, Elsevier Science Publishers.
Co-pending U.S. Appl. No. 11/573,713, filed Apr. 9, 2009 by Inventor Ciuc Miha.
Co-pending U.S. Appl. No. 12/026,484, filed Feb. 5, 2008 by Inventor Capata Adrian.
Co-pending U.S. Appl. No. 12/063,089, filed Feb. 6, 2008 by Inventor Petrescu Stefan.
Co-pending U.S. Appl. No. 12/116,140, filed May 6, 2008 by Inventor Albu Felix.
Co-pending U.S. Appl. No. 12/330,719, filed Dec. 9, 2008 by Inventor Susanu George.
Co-pending U.S. Appl. No. 12/354,707, filed Jan. 15, 2009 by Inventor Catalina Neghina.
Deever, A., "In-camera all-digital video stabilization", Proceedings of the International Conference on Decision Support Systems.Proceedings of ISDSS, 2006, pp. 190-193.
Deller J. et al., "Discrete-Time Processing of Speech Signals," 1999, 2nd. Edition, Wiley-IEEE Press.
Deller, John R. Jr et al., "Discrete-Time Processing of Speech Signals", 1993, 908 pages, IEEE Press Classic Reissue (Hardcover).
Demir, B. et al., "Block motion estimation using adaptive modified two-bit transform", 2007, pp. 215-222, vol. 1—Isuue 2.
Deng G. et al., "The study of logarithmic image processing model and its application to image enhancement," IEEE Trans. on Image Processing, 1995, pp. 506-512, vol. 4.
Dufournaud et al., "Matching Images With Different Resolutions", IEEE Conference Proceedings on Computer Vision and Pattern Recognition, 2000.
Elad et al., "Restoration of a Single Superresolution Image from several Blurred, Noisy and Undersampled Measured Images", IEEE Transactions on Image Processing, 1997, vol. 6—Issue 12.
Elad, Michael et al., "Superresolution Restoration of an Image Sequence: Adaptive Filtering Approach", IEEE Transactions on Image Processing, 1999, pp. 529-541, vol. 8—Issue 3.

Favaro, Paolo, "Depth from focus/defocus, http://homepages.inf.ed.ac.uk/rbf/Cvonline/LOCAL_COPIES/FAVARO1/dfdtutorial.html.", 2002.
Feng, J. et al., "Adaptive block matching motion estimation algorithm using bit plane matching", ICIP, 1995, pp. 496-499.
Final Office Action mailed Nov. 5, 2008, for U.S. Appl. No. 10/986,562, filed Nov. 10, 2004.
Final Office Action mailed Nov. 13, 2008, for U.S. Appl. No. 10/985,657, filed Nov. 10, 2004.
Final Office Action mailed Nov. 13, 2008, for U.S. Appl. No. 11/566,180, filed Dec. 1, 2006.
Final Office Action mailed Nov. 24, 2008, for U.S. Appl. No. 10/985,650, filed Nov. 10, 2004.
Fujita K. et al., An edge-adaptive iterative method for image restoration, Singapore ICCS/ISITA '92."Communications on the Move" Singapore Nov. 16-20, 1992, New York, NY, USA, IEEE, US, Nov. 16, 1992,pp. 361-365, XP010066997, ISBN: 0-7803-0803-4.
Golub G. H. et al., "Matrix Computations," 1996, 3rd edition, John Hopkins University Press, Baltimore.
Gunturk et al., "High-Resolution Image Reconstruction from Multiple Differently Exposed Images," IEEE Signal Processing Letters, 2006, vol. 13, No. 4.
Hayes M., "Statistical Digital Signal Processing and Modeling," 1996, Wiley.
Haykin S., "Adaptive filter theory," 1996, Prentice Hall.
Jannson, Peter A., "Deconvolution of Images and Spectra," 1997, 2nd. Edition, Academic Press.
Jansson, Peter A., "Chapter 1: Convolution and Related Concepts", Deconvolution of Images and Spectra, 1997, 2nd. Edition, Academic Press.
Jourlin M. et al., "Logarithmic image processing the mathematical and physical framework for the representation and processing of transmitted images," Advances in Imaging and Electron Physics, 2001, pp. 129-196, vol. 115.
Ko, S. et al., "Fast digital image stabilizer based on gray-coded bit-plane matching", IEEE Transactions on Consumer Electronics, 1999, pp. 598-603, vol. 45—Issue 3.
Kuglin C. D. et al., "The phase correlation image alignment method," Proc. Int. Conf. Cybernetics and Society, 1975, pp. 163-165, IEEE, Bucharest, Romania.
Lagendijk R. L. et al., "Iterative Identification and Restoration of Images," 1991, Kluwer Academic.
Lane et al., "Automatic multidimensional deconvolution", J. Opt. Soc. Am. A, 1987, pp. 180-188, vol. 4—Issue 1.
Lu Yuan et al, "Image Deblurring with Blurred/Noisy Image Pairs," SIGGRAPH07, Aug. 5-9, 2007.
Pickup, Lyndsey et al., "Optimizing and Learning for Super-resolution," BMVC, Sep. 4-7, 2006.
Mase, Mitsuhito et al., "A Wide Dynamic Range CMOS tmage Sensor with Multiple Exposure-Time Signal Outputs and 12-bit Column-Parallel Cyclic A/D Converters", IEEE Journal of Solid-State Circuits, 2005, vol. 40—Issue 12.
Natarajan B. et al., "Low-complexity block-based motion estimation via one-bit transforms", IEEE Trans. Circuit Syst. Video Technol, 1997, pp. 702-706, vol. 7—Issue 5.
Non-Final Office Action mailed Apr. 3, 2008, for U.S. Appl. No. 10/985,650, filed Nov. 10, 2004.
Non-Final Office Action mailed Apr. 4, 2008, for U.S. Appl. No. 10/986,562, filed Nov. 10, 2004.
Non-Final Office Action mailed Apr. 21, 2009, for U.S. Appl. No. 10/985,650, filed Nov. 10, 2004.
Non-Final Office Action mailed Apr. 22, 2009, for U.S. Appl. No. 10/986,562, filed Nov. 10, 2004.
Non-Final Office Action mailed Jun. 1, 2009, for U.S. Appl. No. 10/985,657, filed Nov. 10, 2004.
Non-Final Office Action mailed Jun. 10, 2009, for U.S. Appl. No. 11/566,180, filed Dec. 1, 2006.
Non-Final Office Action mailed Mar. 18, 2008, for U.S. Appl. No. 10/985,657, filed Nov. 10, 2004.
Non-Final Office Action mailed Mar. 21, 2008, for U.S. Appl. No. 11/566,180, filed Dec. 1, 2006.
Non-Final Office Action mailed May 11, 2009, for U.S. Appl. No. 12/199,680, filed Aug. 27, 2008.
Non-Final Office Action mailed May 29, 2009, for U.S. Appl. No. 12/199,710, filed Aug. 27, 2008.
Oppenheim, A.V. et al., "The Importance of Phase in Signals, XP008060042, ISSN: 0018-9219.", Proceedings of the IEEE, 1981, pp. 529-541, vol. 69—Issue 5.
PCT International Preliminary Report on Patentability for PCT Application PCT/US2007/069638, dated Dec. 10, 2008, 5 pages.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT Notification of Transmittal of the International Search Report and the Written Opinion of the International Searching Authority, or the Declaration, for PCT Application No. PCT/EP2007/009939, dated May 21, 2008, 13 pages.
PCT Notification of Transmittal of the International Search Report and the Written Opinion of the International Searching Authority, or the Declaration, for PCT Application No. PCT/EP2008/004729, dated Oct. 29, 2008, 9 pages.
PCT Written Opinion of the International Preliminary Examining Authority, PCT/EP2005/011011, dated Oct. 24, 2006, 4 pages.
Rahgozar et al., "Motion Estimation Based on Time-Sequentially Sampled Imagery", IEEE Transactions on Image Processing, 1995.
Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.
Sasaki et al., "A Wide Dynamic Range CMOS Image Sensor with Multiple Short-Time Exposures", IEEE Proceedings on Sensors, 2004, pp. 967-972, vol. 2.
Sauer, K. et al., "Efficient Block Motion Estimation Using Integral Projections", IEEE Trans. Circuits, Systems for video Tech, 1996, pp. 513-518, vol. 6—Issue 5.
Seldin et al., "Iterative blind deconvolution algorithm applied to phase retrieval", J. Opt. Soc. Am. A, 1990, pp. 428-433, vol. 7—Issue 3.
Trussell, H.J. et al., "Identification and restoration of spatially variant motion blurs in sequential images, XP002375828", IEEE Transactions on Image Processing, 1992, pp. 123-126, vol. 1—Issue 1.
Uomori, K. et al., "Automatic image stabilizing system by fulldigital signal processing" IEEE Transactions on Consumer Electronics, 1990, vol. 36, No. 3, pp. 510-519.
Notification of Transmittal of the International Search Report and the Written Opinion of the International Searching Authority, or the Declaration for PCT application No. PCT/US2007/069638, dated Mar. 5, 2008, 9 pages.
Non-Final Office Action mailed Jan. 20, 2010, for U.S. Appl. No. 11/690,836, filed Mar. 25, 2007.
Notice of Allowance mailed Apr. 29, 2010, for U.S. Appl. No. 11/690,836, filed Mar. 25, 2007.
Notice of Allowance mailed Dec. 1, 2009, for U.S. Appl. No. 12/199,680, filed Aug. 27, 2008.
Notice of Allowance mailed Dec. 11, 2009, for U.S. Appl. No. 12/199,710, filed Aug. 27, 2008.
Notice of Allowance mailed Nov. 2, 2009, for U.S. Appl. No. 10/985,657, filed Nov. 10, 2004.
Notice of Allowance mailed Nov. 17, 2009, for U.S. Appl. No. 11/566,180, filed Dec. 1, 2006.
Notice of Allowance mailed Oct. 29, 2009, for U.S. Appl. No. 10/985,650, filed Nov. 10, 2004.
Notice of Allowance mailed Oct. 29, 2009, for U.S. Appl. No. 10/986,562, filed Nov. 10, 2004.
PCT Notification of Transmittal of the International Search Report and the Written Opinion of the International Searching Authority, or the Declaration for PCT application No. PCT/EP2009/008674, dated Mar. 29, 2010, 10 pages.
Final Office Action mailed Jul. 8, 2011 for U.S. Appl. No.. 12/137,113, filed Jun. 11, 2008.
Final Office Action mailed Jul. 18, 2011 for U.S. Appl. No. 12/755,338, filed Apr. 6, 2010.

Final Office Action mailed Apr. 25, 2011, for U.S. Appl. No. 11/856,721, filed Sep. 18, 2007.
Final Office Action mailed Mar. 25, 2011, for U.S. Appl. No. 11/764,578, filed Jun. 18, 2007.
Non-Final Office Action mailed Mar. 21, 2011, for U.S. Appl. No. 12/702,092, filed Feb. 8, 2010.
Non-Final Office Action mailed Apr. 8, 2011, for U.S. Appl. No. 12/330,719, filed Dec. 9, 2008.
Non-Final Office Action mailed Apr. 8, 2011, for U.S. Appl. No. 12/901,577, filed Oct. 11, 2010.
Non-Final Office Action mailed Dec. 7, 2010, for U.S. Appl. No. 11/764,578, filed Jun. 18, 2007.
Non-Final Office Action mailed Jan. 21, 2011, for U.S. Appl. No. 12/137,113, filed Jun. 11, 2008.
PCT Notification of Transmittal of International Search Report and the Written Opinion of the International Searching Authority, or the Declaration, for PCT Application No. PCT/EP2005/011011, dated Apr. 24, 2006, 12 pages.
PCT International Preliminary Report on Patentability, Chapter II, for PCT Application No. PCT/EP2007/009939, dated Nov. 16, 2009, 11 pages.
PCT Notification of Transmittal of International Search Report and the Written Opinion of the International Searching Authority, or the Declaration, for PCT Application No. PCT/EP2007/009939, dated May 21, 2008, 13 pages.
PCT Notification of Transmittal of International Search Report and the Written Opinion of the International Searching Authority, or the Declaration, for PCT Application No. PCT/US2007/069638, dated Mar. 5, 2008, 9 pages.
PCT Notification of Transmittal of International Search Report and the Written Opinion of the International Searching Authority, or the Declaration, for PCT Application No. PCT/EP2008/004729, dated Oct. 29, 2008, 14 pages.
PCT Written Opinion of the International Searching Authority, for PCT Application No. PCT/EP2008/004729, dated Dec. 14, 2009, 9 pages.
PCT International Preliminary Report on Patentability Chapter I, for PCT Application No. PCT/EP2008/004729, dated Dec. 17, 2009, 10 pages.
PCT International Preliminary Report on Patentability, Chapter I, for PCT Application No. PCT/EP2009/008674, dated Jun. 14, 2011, 7 pages.
PCT Notification of Transmittal of International Search Report and the Written Opinion of the International Searching Authority, or the Declaration, for PCT Application No. PCT/EP2010/056999, dated Sep. 1, 2010, 10 pages.

* cited by examiner

IMAGE ACQUISITION METHOD AND APPARATUS

PRIORITY

This application claims the benefit of priority under 35 USC §119 to U.S. provisional patent application No. 60/803,980, filed Jun. 5, 2006, and to U.S. provisional patent application No. 60/892,880, filed Mar. 5, 2007, and this application is related to PCT application No. PCT/US2007/069638, filed Jun. 26, 2007, and published as WO 2007/143415 A2 on Dec. 13, 2007, which are incorporated by reference.

The present invention relates to an image acquisition method and apparatus, in particular, the invention addresses the problems of acquisition device or subject movement during image acquisition.

BACKGROUND

The approach to restoring an acquired image which is degraded or unclear either due to acquisition device or subject movement during image acquisition, divides in two categories:

Deconvolution where an image degradation kernel, for example, a point spread function (PSF) is known; and Blind deconvolution where motion parameters are unknown.

Considering blind deconvolution (which is the most often case in real situations), there are two main approaches:

identifying motion parameters, such as PSF separately from the degraded image and using the motion parameters later with any one of a number of image restoration processes; and incorporating the identification procedure within the restoration process. This involves simultaneously estimating the motion parameters and the true image and it is usually done iteratively.

The first blind deconvolution approach is usually based on spectral analysis. Typically, this involves estimating the PSF directly from the spectrum or Cepstrum of the degraded image. The Cepstrum of an image is defined as the inverse Fourier transform of the logarithm of the spectral power of the image. The PSF (point spread function) of an image may be determined from the cepstrum, where the PSF is approximately linear. It is also possible to determine, with reasonable accuracy, the PSF of an image where the PSF is moderately curvilinear. This corresponds to even motion of a camera during exposure. It is known that a motion blur produces spikes in the Cepstrum of the degraded image.

So, for example, FIG. 5a shows an image of a scene comprising a white point on a black background which has been blurred to produce the PSF shown. (In this case, the image and the PSF are the same, however, it will be appreciated that for normal images this is not the case.) FIG. 5b shows the log of the spectrum of the image of FIG. 5a, and this includes periodic spikes in values in the direction 44 of the PSF. The distance from the center of spectrum to the nearest large spike value is equal to the PSF size. FIG. 5c shows the Cepstrum of the image, where there is a spike 40 at the centre and a sequence of spikes 42. The distance between the center 40 and the first spike 42 is equal to the PSF length.

Techniques, for example, as described at M. Cannon "Blind Deconvolution of Spatially Invariant Image Blurs with Phase" published in *IEEE Transactions on Acoustics, Speech, and Signal Processing*, Vol. ASSP-24, NO. 1, February 1976 and refined by R. L. Lagendijk, J. Biemond in "Iterative Identification and Restoration of Images", Kluwer Academic Publishers, 1991 involve searching for those spikes in a Cepstrum, estimating the orientation and dimension of the PSF and, then, reconstructing the PSF from these parameters. This approach is fast and straight-forward, however, good results are usually generally achieved only for uniform and linear motion or for out of focus images. This is because for images subject to non-uniform or non-linear motion, the largest spikes are not always most relevant for determining motion parameters.

A second blind deconvolution approach involves iterative methods, convergence algorithms, and error minimization techniques. Usually, acceptable results are only obtained either by restricting the image to a known, parametric form (an object of known shape on a dark background as in the case of astronomy images) or by providing information about the degradation model. These methods usually suffer from convergence problems, numerical instability, and extremely high computation time and strong artifacts.

A CMOS image sensor may be built which can capture multiple images with short exposure times (SET images) as described in "A Wide Dynamic Range CMOS Image Sensor with Multiple Short-Time Exposures", Sasaki et al, IEEE Proceedings on Sensors, 2004, 24-27 October 2004 Page(s): 967-972 vol. 2.

Multiple blurred and/or undersampled images may be combined to yield a single higher quality image of larger resolution as described in "Restoration of a Single Superresolution Image from Several Blurred, Noisy and Undersampled Measured Images", Elad et al, IEEE Transactions on Image Processing, Vol. 6, No. 12, December 1997.

SUMMARY OF THE INVENTION

A digital image acquisition apparatus is provided. An image acquisition sensor is coupled to imaging optics for acquiring a sequence of images. An image store is for storing images acquired by the sensor. A motion detector is for causing the sensor to cease capture of an image when a degree of movement in acquiring the image exceeds a threshold. A controller selectively transfers the image acquired by the sensor to the image store. A motion extractor determines motion parameters of a selected image stored in the image store. An image re-constructor corrects a selected image with associated motion parameters. An image merger is for merging selected images nominally of the same scene and corrected by the image re-constructor to produce a high quality image of the scene.

The motion extractor may be configured to estimate a point spread function (PSF) for the selected image. The motion extractor may be configured to calculate a Cepstrum for the selected image, identify one or more spikes in the Cepstrum, and select one of the spikes in the Cepstrum as an end point for the PSF. The extractor may be configured to calculate a negative Cepstrum, and to set points in the negative Cepstrum having a value less than a threshold to zero.

The image store may include a temporary image store, and the apparatus may also include a non-volatile memory. The image merger may be configured to store the high quality image in the non-volatile memory.

The motion detector may include a gyro-sensor or an accelerometer, or both.

A further digital image acquisition apparatus is provided. An image acquisition sensor is coupled to imaging optics for acquiring a sequence of images. An image store is for storing images acquired by said sensor. A motion detector causes the sensor to cease capture of an image when the degree of movement in acquiring the image exceeds a first threshold.

One or more controllers cause the sensor to restart capture when a degree of movement is less than a given second threshold, and selectively transfer images acquired by the sensor to the image store. A motion extractor determines motion parameters of a selected image stored in the image store. An image re-constructor corrects a selected image with associated motion parameters. An image merger merges selected images nominally of the same scene and corrected by the image re-constructor to produce a high quality image of the scene.

A first exposure timer may store an aggregate exposure time of the sequence of images. The apparatus may be configured to acquire the sequence of images until the aggregate exposure time of at least a stored number of the sequence of images exceeds a predetermined exposure time for the high quality image. A second timer may store an exposure time for a single image. An image quality analyzer may analyze a single image. The apparatus may be configured to dispose of an image having a quality less than a given threshold quality and/or having an exposure time less than a threshold time.

The image merger may be configured to align the images prior to merging them. The first and second thresholds may include threshold amounts of motion energy.

An image capture method with motion elimination is also provided. An optimal exposure time is determined for the image. A sequence of consecutive exposures is performed, including:

(i) exposing intermediate images until either the optimal exposure time is reached or motion is detected beyond an excessive movement threshold; and (ii) discarding images that have insufficient exposure times or that exhibit excessive movement;

(iii) storing non-discarded intermediate images for further image restoration, including:

(iv) performing motion de-blurring on non-discarded intermediate images;

(v) calculating a signal to noise ratio and, based on the calculating, performing exposure enhancement on the non-discarded images;

(vi) performing registration between restored intermediate images;

(vii) assigning a factor to each of the restored images based on quality of restoration, signal to noise ratio or overall exposure time, or combinations thereof; and (viii) merging the restored images based on a weighted contribution as defined by said factor.

An aggregate exposure time of a sequence of images may be stored. The sequence of images may be acquired until the aggregate exposure time of at least a stored number of images exceeds a predetermined exposure time for a high quality image. An exposure time may be stored for a single image, and/or an image quality may be analyzed for a single image. An image may be disposed of that has an exposure time less than a threshold time and/or a quality less than a given threshold quality.

The merging may include aligning each restored image. A threshold may include a threshold amount of motion energy.

BRIEF DESCRIPTION OF THE DRAWINGS

Embodiments will now be described by way of example, with reference to the accompanying drawings, in which.

DETAILED DESCRIPTION OF THE PREFERRED EMBODIMENTS

Figure 1:
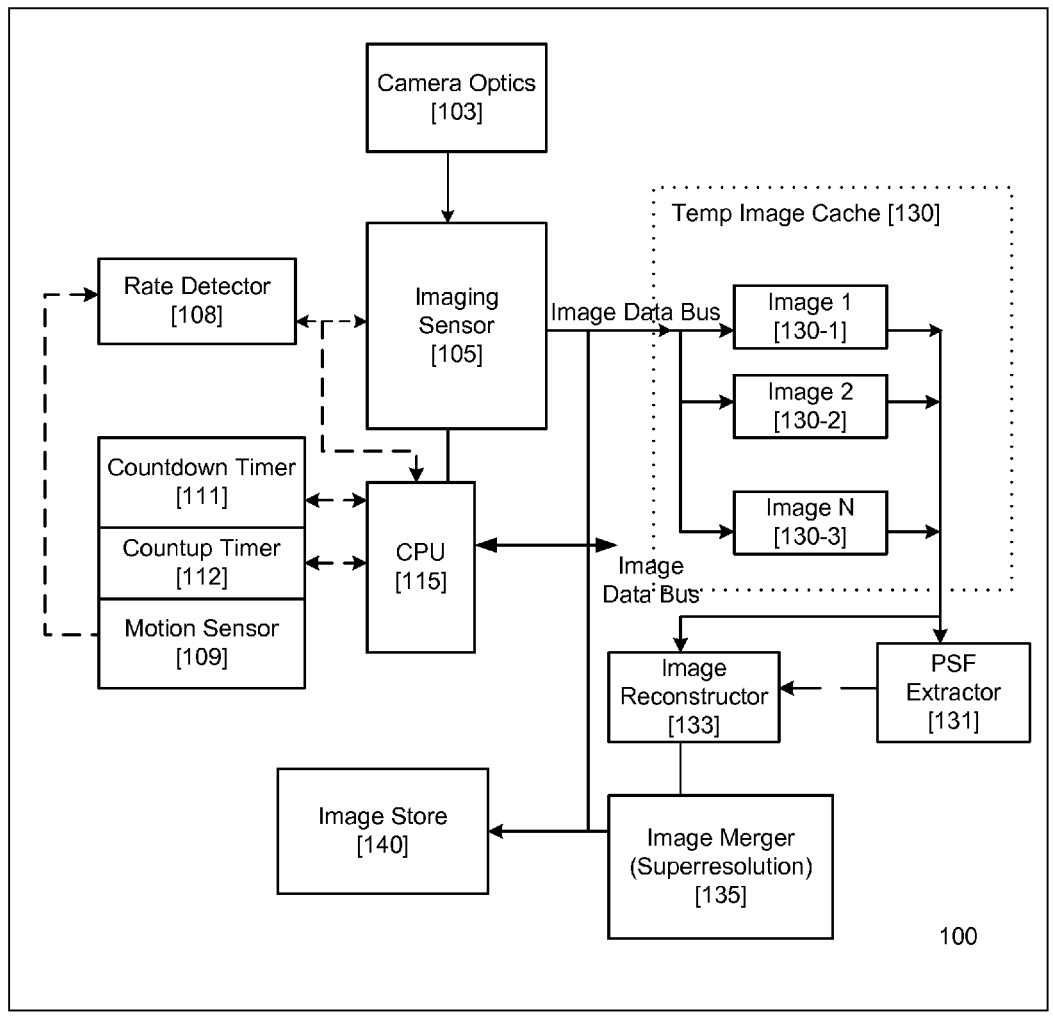
FIG. 1 illustrates schematically a digital image acquisition apparatus according to an embodiment.

An image acquisition system is provided in accordance with an embodiment which incorporates a motion sensor and utilizes techniques to compensate for motion blur in an image.

One embodiment is a system that includes the following:

(1) the image acquisition apparatus comprises a imaging sensor, which could be CCD, CMOS, etc., hereinafter referred to as CMOS;

(2) a motion sensor (Gyroscopic, Accelerometer or a combination thereof);

(3) a fast memory cache (to store intermediate images); and (4) a real-time subsystem for determining the motion (PSF) of an image. Such determination may be done in various ways. One preferred method is determining the PSF based on the image cepstrum.

In addition, the system can include a correction component, which may include:

(a) a subsystem for performing image restoration based on the motion PSF, (b) an image merging subsystem to perform registration of multi-images and merging of images or part of images (c) a CPU for directing the operations of these subsystems.

In certain embodiments some of these subsystems may be implemented in firmware and executed by the CPU. In alternative embodiments it may be advantageous to implement some, or indeed all of these subsystems as dedicated hardware units. Alternatively, the correction stage may be done in an external system to the acquisition system, such as a personal computer that the images are downloaded to.

In one embodiment, the ceptrum may include the Fourier transform of the log-magnitude spectrum: fFt(ln(ln(|fFt(window.signal)|)).

In a preferred embodiment the disclosed system is implemented on a dual-CPU image acquisition system where one of the CPUs is an ARM and the second is a dedicated DSP unit. The DSP unit has hardware subsystems to execute complex arithmetical and Fourier transform operations which provides computational advantages for the PSF extraction.

Image Restoration and Image Merging Subsystems

In a preferred embodiment, when the acquisition subsystem is activated to capture an image it executes the following initialization steps: (i) the motion sensor and an associated rate detector are activated; (ii) the cache memory is set to point to the first image storage block; (iii) the other image processing subsystems are reset and (iv) the image sensor is signaled to begin an image acquisition cycle and (v) a countdown timer is initialized with the desired exposure time, a count-up timer is set to zero, and both are started.

In a given scene an exposure time is determined for optimal exposure. This will be the time provided to the main exposure timer. Another time period is the minimal-accepted-partially exposed image. When an image is underexposed (the integration of photons on the sensor is not complete) the signal to noise ratio is reduced. Depending on the specific device, the minimal accepted time is determined where sufficient data is available in the image without the introduction of too much noise. This value is empirical and relies on the specific configuration of the sensor acquisition system.

The CMOS sensor proceeds to acquire an image by integrating the light energy falling on each sensor pixel. If no motion is detected, this continues until either the main exposure timer counts down to zero, at which time a fully exposed image has been acquired. However, in this aforementioned embodiment, the rate detector can be triggered by the motion sensor. The rate detector is set to a predetermined threshold. One example of such threshold is one which indicates that the motion of the image acquisition subsystem is about to exceed the threshold of even curvilinear motion which will allow the PSF extractor to determine the PSF of an acquired image. The motion sensor and rate detector can be replaced by an accelerometer and detecting a +/− threshold level. The decision of what triggers the cease of exposure can be made on input form multiple sensor and or a forumale trading of non-linear motion and exposure time.

When the rate detector is triggered then image acquisition by the sensor is halted. At the same time the count-down timer is halted and the value from the count-up timer is compared with a minimum threshold value. If this value is above the minimum threshold then a useful SET image was acquired and sensor read-out to memory cache is initiated. The current SET image data may be loaded into the first image storage location in the memory cache, and the value of the count-up timer (exposure time) is stored in association with the image. The sensor is then re-initialized for another short-time image acquisition cycle, the count-up timer is zeroed, both timers are restarted and a new image acquisition is initiated.

If the count-up timer value is below the minimum threshold then there was not sufficient time to acquire a valid short-time exposure and data read-out form the sensor is not initiated. The sensor is re-initialized for another short-time exposure, the value in the count-up timer is added to the count-down timer (thus restoring the time counted down during the acquisition cycle), the count-up timer is re-initialized, then both timers are restarted and a new image acquisition is initiated.

This process repeats itself until in total the exposure exceeds the needed optimal integration time. If for example in the second SET image reaches full term of exposure, it will then become the final candidate, with no need to perform post processing integration. If however, no single image exceeds the optimal exposure time, an integration is performed. This cycle of acquiring another short-time image continues until the count-down timer reaches zero—in a practical embodiment the timer will actually go below zero because the last short-time image which is acquired must also have an exposure time greater than the minimum threshold for the count-up timer. At this point there should be N short-time images captured and stored in the memory cache. Each of these short-time images will have been captured with an curvilinear motion-PSF. The total sum of N may exceeds the optimal exposure time, which in this case the "merging system will have more images or more data to choose from overall.

After a sufficient exposure is acquired it is now possible in a preferred embodiment to recombine the separate short-term exposure images as follows:

(i) each image is processed by a PSF extractor which can determine the linear or curvilinear form of the PSF which blurred the image;

(ii) the image is next passed onto an image re-constructor which also takes the extracted PSF as an input; this reconstructs each short-time image in turn. Depending on the total exposure time, this image may also go through exposure enhancement which will increase its overall contribution to the final image. Of course, the decision whether to boost up the exposure is a tradeoff between the added exposure and the potential introduction of more noise into the system. The decision is performed based on the nature of the image data (highlight, shadows, original exposure time) as well as the available SET of images altogether. In a pathological example if only a single image is available that only had 50% exposure time, it will need to be enhanced to 2× exposure even at the risk of having some noise. If however, two images exist each with 50% exposure time, and the restoration is considered well, no exposure will be needed. Finally, the motion-corrected and exposure corrected images are passed it onto; and (iii) the image merger; the image merger performs local and global alignment of each short-term image using techniques which are well-known to those skilled in the arts of super-resolution; these techniques allow each deblurred short-time image to contribute to the construction of a higher resolution main image.

Figure 2A:
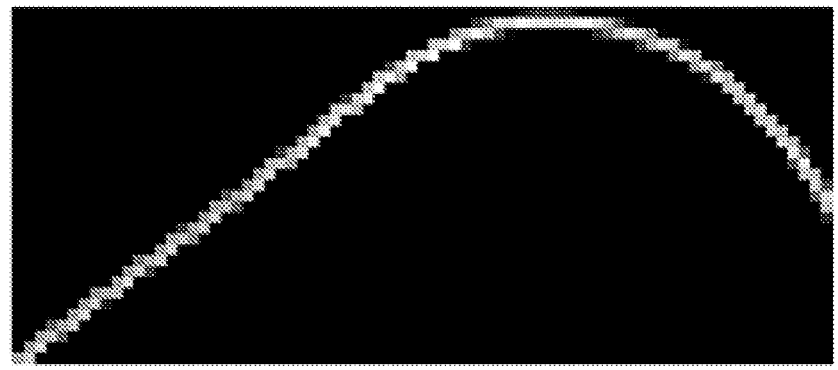
FIGS. 2a-2b illustrate (a) a PSF for a single image and (b) the PSFs for three corresponding SET images acquired according to the an embodiment.
Figure 2B:
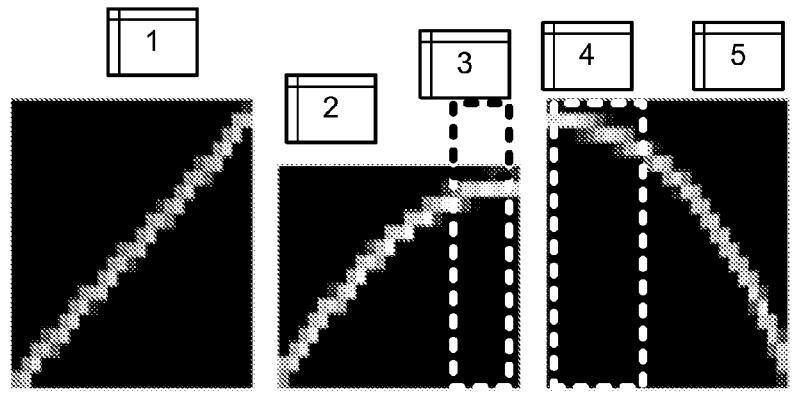

This approach has several advantages including:

(1) the number of SET is kept to a minimum; if the motion throughout an exposure is constant linear or curvilinear motion then only a single image need be captured;

(2) the decision of who at images are used to create the Final image are determined post processing thus enabling more flexibility in determining the best combination, where the motion throughout an exposure is mostly regular, but some rapid deviations appear in the middle the invention will effectively "skip over" these rapid deviations and a useful image can still be obtained; this would not be possible with a conventional image acquisition system which employed super-resolution techniques because the SET images are captured for a fixed time interval;

(3) where the image captured is of a time frame that is too small, this portion can be discarded;

FIG. 2a shows an Original PSF and FIG. 2b shows partial PSFs. Referring now to FIG. 1, which illustrates a digital image acquisition apparatus 100 according to a preferred embodiment of the present invention, the apparatus 100 comprises a CMOS imaging sensor 105 coupled to camera optics 103 for acquiring an image.

The apparatus includes a CPU 115 for controlling the sensor 105 and the operations of sub-systems within the apparatus. Connected to the CPU 115 are a motion sensor 109 and an image cache 130. Suitable motion sensors include a gyroscopic sensor (or a pair of gyro sensors) that measures the angular velocity of the camera around a given axis, for example, as produced by Analog Devices' under the part number ADXRS401.

In FIG. 1, a subsystem 131 for estimating the motion parameters of an acquired image and a subsystem 133 for performing image restoration based on the motion parameters for the image are shown coupled to the image cache 130. In the embodiment, the motion parameters provided by the extractor sub-system 131 comprise an estimated PSF calculated by the extractor 131 from the image Cepstrum.

An image merging subsystem 135 connects to the output of the image restoration sub-system 133 to produce a single image from a sequence of one or more de-blurred images.

In certain embodiments some of these subsystems of the apparatus 100 may be implemented in firmware and executed by the CPU; whereas in alternative embodiments it may be advantageous to implement some, or indeed all of these subsystems as dedicated hardware units.

So for example, in a preferred embodiment, the apparatus 100 is implemented on a dual-CPU system where one of the CPUs is an ARM Core and the second is a dedicated DSP unit. The DSP unit has hardware subsystems to execute complex arithmetical and Fourier transform operations, which provides computational advantages for the PSF extraction 131, image restoration 133 and image merging 135 subsystems.

When the apparatus 100 is activated to capture an image, it firstly executes the following initialization steps:

(i) the motion sensor 109 and an associated rate detector 108 are activated;

(ii) the cache memory 130 is set to point to a first image storage block 130-1;

(iii) the other image processing subsystems are reset;

(iv) the image sensor 105 is signaled to begin an image acquisition cycle; and (v) a count-down timer 111 is initialized with the desired exposure time, a count-up timer 112 is set to zero, and both are started.

The CMOS sensor 105 proceeds to acquire an image by integrating the light energy falling on each sensor pixel; this continues until either the main exposure timer counts 111 down to zero, at which time a fully exposed image has been acquired, or until the rate detector 108 is triggered by the motion sensor 109. The rate detector is set to a predetermined threshold which indicates that the motion of the image acquisition subsystem is about to exceed the threshold of even curvilinear motion which would prevent the PSF extractor 131 accurately estimating the PSF of an acquired image.

In alternative implementations, the motion sensor 109 and rate detector 108 can be replaced by an accelerometer (not shown) and detecting a +/− threshold level. Indeed any suitable subsystem for determining a degree of motion energy and comparing this with a threshold of motion energy could be used.

When the rate detector 108 is triggered, then image acquisition by the sensor 105 is halted; at the same time the count-down timer 111 is halted and the value from the count-up timer 112 is compared with a minimum threshold value. If this value is above the minimum threshold then a useful short exposure time (SET) image was acquired and sensor 105 read-out to memory cache 130 is initiated; the current SET image data is loaded into the first image storage location in the memory cache, and the value of the count-up timer (exposure time) is stored in association with the SET image.

The sensor 105 is then re-initialized for another SET image acquisition cycle, the count-up timer is zeroed, both timers are restarted and a new image acquisition is initiated.

If the count-up timer 112 value is below the minimum threshold, then there was not sufficient time to acquire a valid SET image and data read-out from the sensor is not initiated. The sensor is re-initialized for another short exposure time, the value in the count-up timer 112 is added to the count-down timer 111 (thus restoring the time counted down during the acquisition cycle), the count-up timer is re-initialized, then both timers are restarted and a new image acquisition is initiated.

This cycle of acquiring another SET image 130-n continues until the count-down timer 111 reaches zero. Practically, the timer will actually go below zero because the last SET image which is acquired must also have an exposure time greater than the minimum threshold for the count-up timer 112. At this point, there should be N short-time images captured and stored in the memory cache 130. Each of these SET images will have been captured with a linear or curvilinear motion-PSF.

FIGS. 2a-2b illustrates Point Spread Functions (PSF). FIG. 2(a) shows the PSF of a full image exposure interval; and FIG. 2(b) shows how this is split into five SET-exposures by the motion sensor. In FIG. 2, boxes (1) through (5) are shown, and:

(1) will be used and with the nature of the PSF it has high probability of good restoration and also potential enhancement using gain;

(2) can be well restored;

(3) will be discarded as too short of an integration period;

(4) will be discarded having a non-curvliniar motion; and (5) can be used for the final image.

So for example, while a single image captured with a full-exposure interval might have a PSF as shown in FIG. 2(a), a sequence of 3 images captured according to the above embodiment, might have respective PSFs as shown in FIG. 2(b). It will be seen that the motion for each of these SET image PSFs more readily lends the associated images to de-blurring than the more complete motion of FIG. 2(a).

After a sufficient exposure is acquired, it is now possible to recombine the separate SET images 130-1 . . . 130-N as follows:

(i) each image is processed by the PSF extractor 131 which estimates the PSF which blurred the SET image;

(ii) the image is next passed onto the image re-constructor 133 which as well as each SET image takes the corresponding estimated PSF as an input; this reconstructs each SET image in turn and passes it onto the image merger 135;

(iii) the image merger 135 performs local and global alignment of each SET image using techniques which are well-known to those skilled in the art of super-resolution. These techniques allow each de-blurred SET image to contribute to the construction of a higher resolution main image which is then stored in image store 140. The image merger may during merging decide to discard an image where it is decided it is detrimental to the final quality of the merged image; or alternatively various images involved in the merging process can be weighted according to their respective clarity.

This approach has several benefits over the prior art:

(i) the number of SET images is kept to a minimum; if the motion throughout an exposure is constant linear or curvilinear motion then only a single image needs to be captured;

(ii) where the motion throughout an exposure is mostly regular, but some rapid deviations appear in the middle, the embodiment will effectively "skip over" these rapid deviations and a useful image can still be obtained. This would not be possible with a conventional image acquisition system which employed super-resolution techniques, because the SET images are captured for a fixed time interval.

Although the embodiment above could be implemented with a PSF extractor 131 based on conventional techniques mentioned in the introduction, where a PSF involves slightly curved or non-uniform motion, the largest spikes may not always be most relevant for determining motion parameters, and so conventional approaches for deriving the PSF even of SET images such as shown in FIG. 2(b) may not provide satisfactory results.

Thus, in a particular implementation of the present invention, the PSF extractor 131 rather than seeking spikes in a Cepstrum, seeks large regions around spikes in the Cepstrum of an image using a region-growing algorithm. This is performed by inspecting candidate spikes in the Cepstrum, using region growing around these candidates and then discriminating between them. Preferably, the candidate spike of the largest region surrounding a candidate spike will be the point chosen as the last point of the PSF.

Figure 3A:
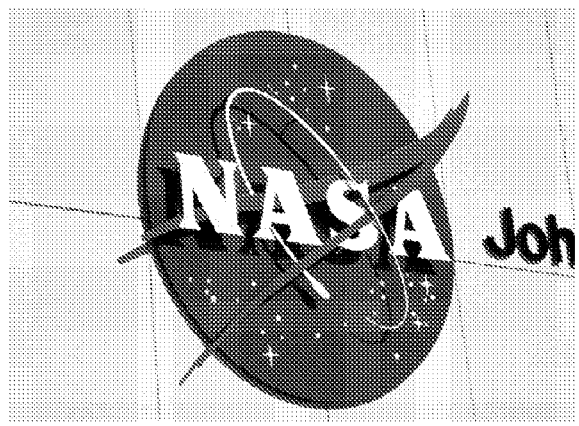
FIGS. 3a-3c illustrate how blurring of partially exposed images can reduce the amount of motion blur in the image.
Figure 3B:
Figure 3C:
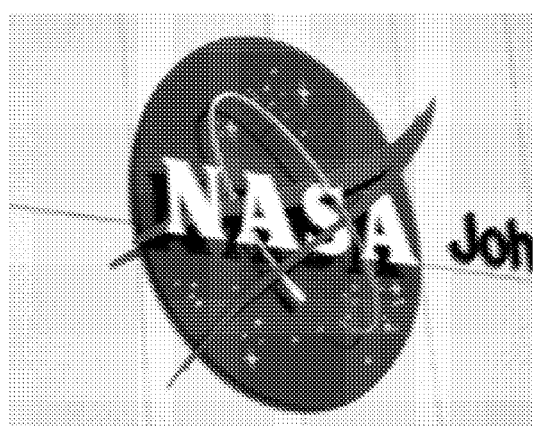

It can be seen from FIGS. 3a-3c that blurring the partially exposed image reduces the amount of motion blur in the image. FIG. 3(a) shows an original image. FIG. 3(b) illustrates blurring with full PSF. FIG. 3(c) illustrates reconstructed image from 3 SET images using individual PSFs.

Referring to FIG. 3, an SET image 130-1 . . . 130-N is represented in the RGB space (multi-channel) or as a gray-scale ("one-channel"). The Cepstrum may be computed on each color channel (in the case of multi-channel image) or only on one of them and so, by default, the Cepstrum would have the size of the degraded image. In the preferred embodiment, the Fourier transform is performed, step 32 only on the green channel. It will also be seen that, for processing simplicity, the results are negated to provide a negative Cepstrum for later processing.

In variations of the embodiment, the Cepstrum may be computed:
- on each channel and, afterwards, averaged; or
- on the equivalent gray image.

After computing the negative Cepstrum, the blurred image 130 is not necessary for the extractor 131 and can be released from memory or for other processes. It should also be seen that as the Cepstrum is symmetrical towards its center (the continuous component), only one half is required for further processing.

As discussed in the introduction, images which are degraded by very large movements are difficult to restore. Experiments have shown that if the true PSF is known, a restored image can have an acceptable quality where the PSF is smaller than 10% of the image size. The preferred embodiment ideally only operates on images subject to minimal movement. Thus, the original image can either be sub-sampled, preferably to ⅓ of its original size or once the Cepstrum is computed, it can be sub-sampled before further processing or indeed during further processing without having a detrimental affect on the accuracy of the estimated PSF where movement is not too severe. This can also be considered valid as the blurring operation may be seen as a low-pass filtering of an image (the PSF is indeed a low pass filter); and therefore there is little benefit in looking for PSF information in the high frequency domain.

The next step 34 involves thresholding the negative Cepstrum. This assumes that only points in the negative Cepstrum with intensities higher than a threshold (a certain percent of the largest spike) are kept. All the other values are set to zero. This step has, also, the effect of reducing noise. The value of the threshold was experimentally set to 9% of the largest spike value.

Pixel candidates are then sorted with the largest spike (excluding the Cepstrum center) presented first as input to a region-growing step 36, then the second spike and so on.

The region-growing step 36 has as main input a sequence of candidate pixels (referred to by location) as well as the Cepstrum and it returns as output the number of pixels in a region around each candidate pixel. Alternatively, it could return the identities of all pixels in a region for counting in another step, although this is not necessary in the present embodiment. A region is defined as a set of points with similar Cepstrum image values to the candidate pixel value. In more detail, the region-growing step 36 operates as follows:
1. Set the candidate pixel as a current pixel.
2. Inspect the neighbors of the current pixel—up to 8 neighboring pixels may not already be counted in the region for the candidate pixel or other regions. If the neighboring pixel meets an acceptance condition, preferably that its value is larger than 0.9 of the value of the candidate pixel value, then include it in the region for the candidate pixel, exclude the pixel from further regions, and increment the region size.
3. If a maximum number of pixels, say 128, has been reached, exit
4. After finished inspecting neighbors for the current pixel, if there are still un-investigated pixels, set the first included pixel as the current pixel and jump to step 2.
5. If there are no more un-investigated adjacent pixels, exit.

As can be seen, each pixel may be included in only one region. If the region-growing step 36 is applied to several candidate pixels, then a point previously included in a region will be skipped when investigating the next regions.

Figure 4:
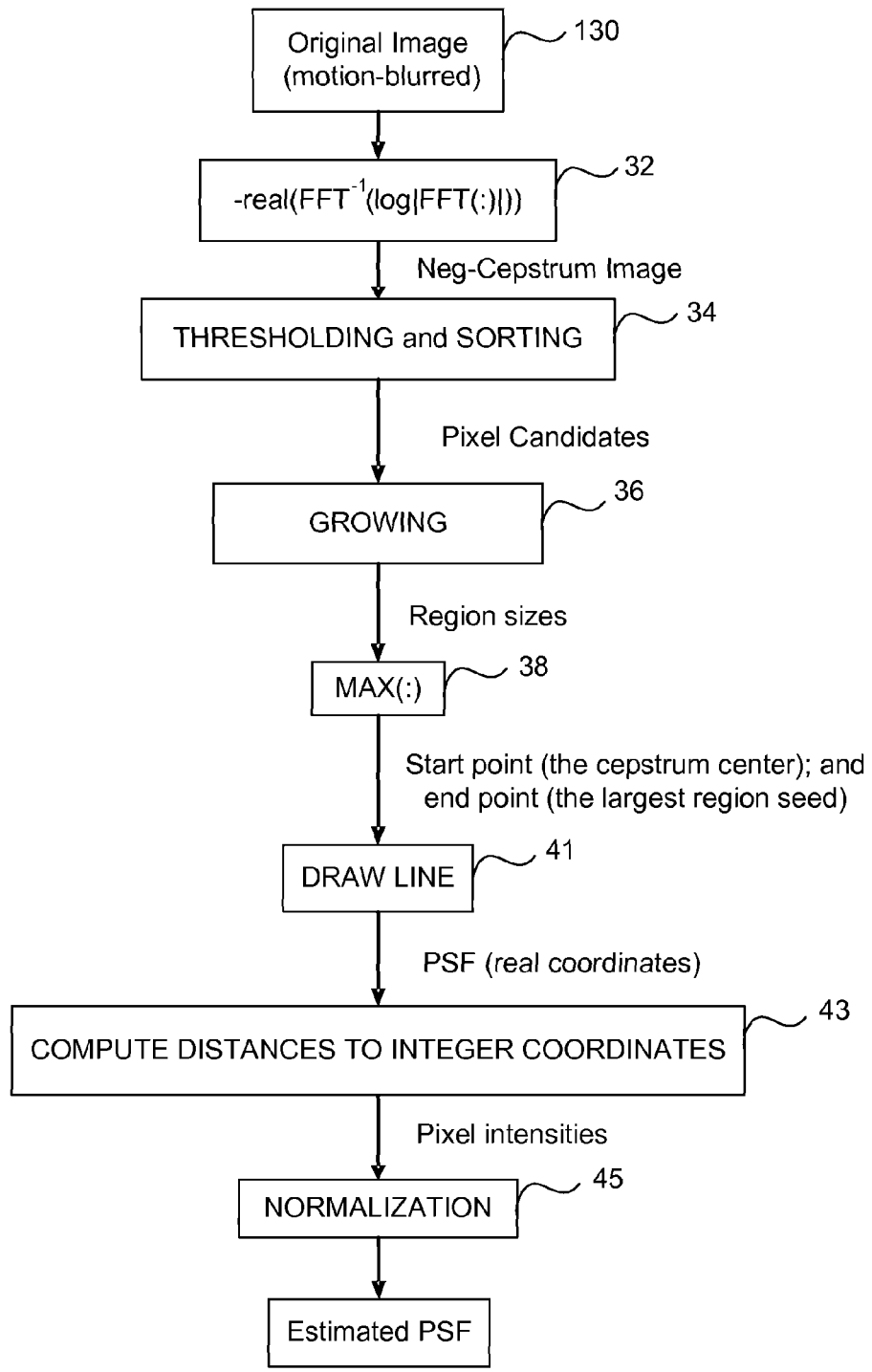
FIG. 4 illustrates the generation of a PSF for an image acquired in accordance with an embodiment.

After comparison of the sizes of all grown regions, step 38, the pixel chosen is the candidate pixel for the region with the greatest number of pixels and this selected point is referred to as the PSF "end point". The PSF "start point" is chosen the center of the Cepstrum, point 40 in FIG. 4(b)(ii).

Figure 5A:
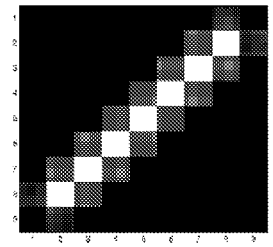
FIGS. 5a-5e illustrate sample images/PSFs and their corresponding Cepstrums.
Figure 5D:
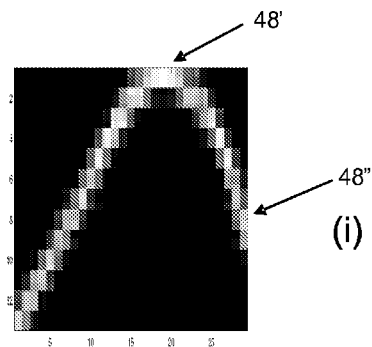
Figure 5B:
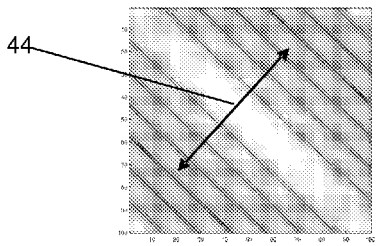
Figure 5E:
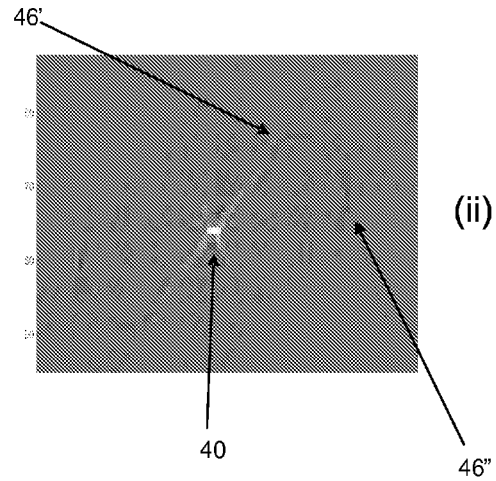
Figure 5C:
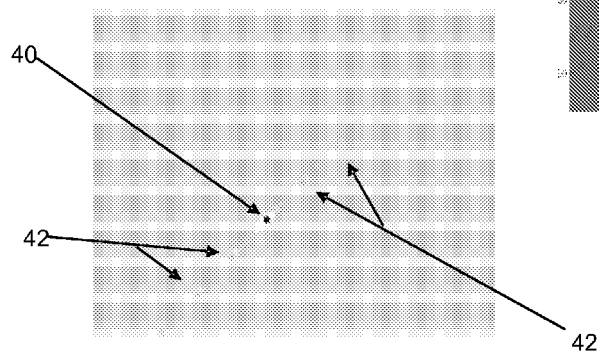

Referring to FIG. 5(d), where the negative Cepstrum has been obtained from an image, FIG. 5(e) degraded with a non-linear PSF, there are areas 46', 46" with spikes (rather than a single spike) which correspond to PSF turning points 48', 48", and it is areas such as these in normal images which the present implementation attempts to identify in estimating the PSF for an SET image.

Figure 6:
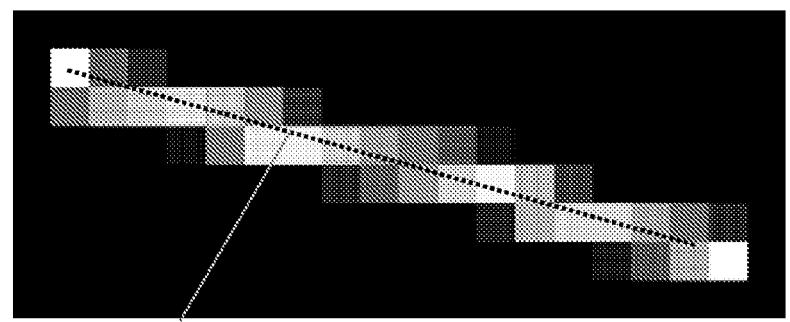
FIG. 6 illustrates an estimate of a PSF constructed according to an embodiment.

In a continuous space, the estimated PSF would be a straight-line segment, such as the line 50 linking PSF start and end points, as illustrated at FIG. 6. In the present embodiment, the straight line is approximated in the discrete space of the digital image, by pixels adjacent the straight-line 50 linking the PSF start and end points, as illustrated at FIG. 6. Thus, all the pixels adjacent the line 50 connecting the PSF start and end points are selected as being part of the estimated PSF, step 41. For each PSF pixel, intensity is computed by inverse proportionality with the distance from its center to the line 50, step 43. After the intensities of all pixels of the PSF are computed, a normalization of these values is performed such that the sum of all non-zero pixels of the PSF equals 1, step 45.

Using the approach above, it has been shown that if the type of movement in acquiring the component SET images of an image is linear or near linear, then the estimated PSF produced by the extractor 131 as described above provides good estimate of the actual PSF for deblurring.

As the curving of movement increases, during restoration, ringing proportional to the degree of curving is introduced. Similarly, if motion is linear but not uniform, restoration introduces ringing which is proportional with the degree of non-uniformity. The acceptable degree of ringing can be used to tune the motion sensor 108 and rate detector 109 to produce the required quality of restored image for the least number of SET images.

Also, if this PSF extractor 131 is applied to images which have been acquired with more than linear movement, for example, night pictures having a long exposure time, although not useful for deblurring, the estimated PSF provided by the extractor 131 can provide a good start in the determination of the true PSF by an iterative parametric blind deconvolution process (not shown) for example based on Maximum Likelihood Estimation, as it is known that the results of such processes fade if a wrong starting point is chosen.

The above embodiment has been described in terms of a CMOS imaging sensor 105. In alternative implementations, a CCD image sensor or indeed any another suitable image sensor could be used. For a CCD, which is typically used with a shutter and which might normally not be considered suitable for providing the fine level of control required by the present invention, progressive readout of an image being acquired should be employed rather than opening and closing the shutter for each SET image.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, as well as U.S. published patent applications Ser. Nos. 2006/0204110, 2006/0098890, 2005/0068446, 2006/0039690, and 2006/0285754, and U.S. patent applications Ser. Nos. 60/773, 714, 60/803,980, and 60/821,956, which are to be or are assigned to the same assignee, are all hereby incorporated by reference into the detailed description of the preferred embodiments as disclosing alternative embodiments and components.

In addition, the following U.S. published patent applications are hereby incorporated by reference for all purposes including into the detailed description as disclosing alternative embodiments:

U.S. Ser. No. 2005/0219391—Luminance correction using two or more captured images of same scene.

U.S. Ser. No. 2005/0201637—Composite image with motion estimation from multiple images in a video sequence.

U.S. Ser. No. 2005/0057687—Adjusting spatial or temporal resolution of an image by using a space or time sequence (claims are quite broad)

U.S. Ser. No. 2005/0047672—Ben-Ezra patent application; mainly useful for supporting art; uses a hybrid imaging system with fast and slow detectors (fast detector used to measure PSF).

U.S. Ser. No. 2005/0019000—Supporting art on super-resolution.

U.S. Ser. No. 2006/0098237—Method and Apparatus for Initiating Subsequent Exposures Based on a Determination of Motion Blurring Artifacts (and Ser. Nos. 2006/0098890 and 2006/0098891).

The following provisional application is also incorporated by reference: Ser. No. 60/773,714, filed Feb. 14, 2006 entitled Image Blurring

We claim:

1. A digital image acquisition apparatus, comprising:
an image acquisition sensor coupled to imaging optics for acquiring a sequence of images;
an image store for storing two or more of said sequence of images acquired by said sensor;
a motion detector for causing said sensor to cease capture of an image when the degree of movement of the apparatus in acquiring said image exceeds a threshold, and wherein exposure times of two or more of said sequence of images differ based on different degrees of movement of the apparatus;
a controller for selectively transferring said two or more of said images acquired by said sensor to said image store;
a motion extractor for determining motion parameters of at least one selected image stored in said image store, wherein the motion extractor is configured to:
estimate a point spread function (PSF) for said selected image;
calculate a Cepstrum for said selected image;
identify one or more spikes in said Cepstrum; and
select one of said spikes in said Cepstrum as an end point for said PSF;
an image re-constructor for correcting said at least one selected image with associated motion parameters; and
an image merger for merging a selected plurality of images including said two or more images, and including said at least one selected image corrected by said image re-constructor to produce a high quality image of said scene.

2. An apparatus as claimed in claim 1, wherein said extractor is configured to calculate a negative Cepstrum, and to set points in said negative Cepstrum having a value less than a threshold to zero.

3. An apparatus as claimed in claim 1, wherein said image stored comprises a temporary image store, and wherein said apparatus further comprises a non-volatile memory, said image merger being configured to store said high quality image in said non-volatile memory.

4. An apparatus as claimed in claim 1, wherein said motion detector comprises a gyro-sensor or an accelerometer, or both.

5. The apparatus of claim 1, wherein said different degrees of movement comprise different degrees of non linear movement.

6. The apparatus of claim 1, wherein said image re-constructor is configured for enhancing an exposure of the at least one selected image.

7. A digital image acquisition apparatus, comprising:
an image acquisition sensor coupled to imaging optics for acquiring a sequence of images;
an image store for storing two or more of said sequence of images acquired by said sensor;
a motion detector for causing said sensor to cease capture of an image when the degree of movement of the apparatus in acquiring said image exceeds a first threshold, and wherein exposure times of two or more of said sequence of images differ based on different degrees of movement of the apparatus;
one or more controllers that causes the sensor to restart capture when the degree of movement of the apparatus is less than a given second threshold and that selectively transfers said two or more of said sequence of images acquired by said sensor to said image store;
a motion extractor for determining motion parameters of at least one selected image stored in said image store, wherein the motion extractor is configured to:
estimate a point spread function (PSF) for said selected image;
calculate a Cepstrum for said selected image;
identify one or more spikes in said Cepstrum; and
select one of said spikes in said Cepstrum as an end point for said PSF;
an image re-constructor for correcting the at least one selected image with associated motion parameters; and
an image merger for merging a selected plurality of images including said two or more images, and including said at least one selected image corrected by said image re-constructor, to produce a high quality image of said scene.

8. An apparatus as claimed in claim 7, further comprising a first exposure timer for storing an aggregate exposure time of said sequence of images, and wherein said apparatus is configured to acquire said sequence of images until the aggregate exposure time of at least a stored number of said sequence of images exceeds a predetermined exposure time for said high quality image.

9. An apparatus as claimed in claim 8, further comprising a second timer for storing an exposure time for a single image, and wherein said apparatus is configured to dispose of an image having an exposure time less than a threshold time.

10. An apparatus as claimed in claim 8, further comprising an image quality analyzer for a single image, and wherein said apparatus is configured to dispose of an image having a quality less than a given threshold quality.

11. An apparatus as claimed in claim 7, wherein said image merger is configured to align said selected plurality of images prior to merging said images.

12. An apparatus as claimed in claim 7, wherein said first and second thresholds comprise threshold amounts of motion energy.

13. The apparatus of claim 7, wherein said different degrees of movement comprise different degrees of non linear movement.

14. The apparatus of claim 7, wherein said image re-constructor is configured for enhancing an exposure of the at least one selected image.

15. A digital image acquisition apparatus, comprising:
an image acquisition sensor coupled to imaging optics for acquiring a sequence of images;
an image store for storing one or more of said images acquired by said sensor;
a motion detector for causing said sensor to cease capture of an image when the degree of movement of the apparatus in acquiring said image exceeds a threshold;
a controller for selectively transferring said one or more of said images acquired by said sensor to said image store;
a motion extractor for determining motion parameters of a selected image stored in said image store;
an image re-constructor for correcting a selected image with associated motion parameters; and
an image merger for merging a selected plurality of images nominally of the same scene and corrected by said image re-constructor to produce a high quality image of said scene, and
wherein the motion extractor is configured to:
estimate a point spread function (PSF) for said selected image;
calculate a Cepstrum for said selected image;
identify one or more spikes in said Cepstrum; and
select one of said spikes in said Cepstrum as an end point for said PSF.

16. An apparatus as claimed in claim 15, wherein said extractor is configured to calculate a negative Cepstrum, and to set points in said negative Cepstrum having a value less than a threshold to zero.

17. An apparatus as claimed in claim 15, wherein said image stored comprises a temporary image store, and wherein said apparatus further comprises a non-volatile memory, said image merger being configured to store said high quality image in said non-volatile memory.

18. An apparatus as claimed in claim 15, wherein said motion detector comprises a gyro-sensor or an accelerometer, or both.

19. A digital image acquisition apparatus, comprising:
an image acquisition sensor coupled to imaging optics for acquiring a sequence of images;
an image store for storing one or more of said images acquired by said sensor;
a motion detector for causing said sensor to cease capture of an image when the degree of movement of the apparatus in acquiring said image exceeds a first threshold ;
one or more controllers that causes the sensor to restart capture when the degree of movement of the apparatus is less than a given second threshold and that selectively transfers said one or more of said images acquired by said sensor to said image store;
a motion extractor for determining motion parameters of a selected image stored in said image store;
an image re-constructor for correcting a selected image with associated motion parameters; and
an image merger for merging a selected plurality of images nominally of the same scene and corrected by said image re-constructor to produce a high quality image of said scene, and
wherein the motion extractor is configured to:
estimate a point spread function (PSF) for said selected image;
calculate a Cepstrum for said selected image;
identify one or more spikes in said Cepstrum; and
select one of said spikes in said Cepstrum as an end point for said PSF.

20. An apparatus as claimed in claim 19, further comprising a first exposure timer for storing an aggregate exposure time of said sequence of images, and wherein said apparatus is configured to acquire said sequence of images until the aggregate exposure time of at least a stored number of said sequence of images exceeds a predetermined exposure time for said high quality image.

21. An apparatus as claimed in claim 20, further comprising a second timer for storing an exposure time for a single image, and wherein said apparatus is configured to dispose of an image having an exposure time less than a threshold time.

22. An apparatus as claimed in claim 20, further comprising an image quality analyzer for a single image, and wherein said apparatus is configured to dispose of an image having a quality less than a given threshold quality.

23. An apparatus as claimed in claim 19, wherein said image merger is configured to align said selected plurality of images prior to merging said images.

24. An apparatus as claimed in claim 19, wherein said first and second thresholds comprise threshold amounts of motion energy.

* * * * *